United States Patent
Pepin et al.

(10) Patent No.: US 9,237,447 B2
(45) Date of Patent: Jan. 12, 2016

(54) DEVICE AND METHOD FOR MANAGING ACCESS RIGHTS TO A WIRELESS NETWORK

(75) Inventors: Cyrille Pepin, Paris (FR); Francois Lecocq, Paris (FR)

(73) Assignee: MORPHO, Paris (FR)

( * ) Notice: Subject to any disclaimer, the term of this patent is extended or adjusted under 35 U.S.C. 154(b) by 0 days.

(21) Appl. No.: 13/503,416

(22) PCT Filed: Oct. 20, 2010

(86) PCT No.: PCT/EP2010/065828
§ 371 (c)(1),
(2), (4) Date: Apr. 23, 2012

(87) PCT Pub. No.: WO2011/048161
PCT Pub. Date: Apr. 28, 2011

(65) Prior Publication Data
US 2012/0210401 A1  Aug. 16, 2012

(30) Foreign Application Priority Data
Oct. 23, 2009 (FR) .................................. 09 57463

(51) Int. Cl.
*H04W 12/08* (2009.01)
*H04L 29/06* (2006.01)
*H04W 12/06* (2009.01)
*H04W 88/02* (2009.01)

(52) U.S. Cl.
CPC ............ *H04W 12/08* (2013.01); *H04L 63/101* (2013.01); *H04L 63/20* (2013.01); *H04L 63/0853* (2013.01); *H04W 12/06* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 2003/0203740 A1* | 10/2003 | Bahl et al. ..................... | 455/516 |
| 2006/0090023 A1 | 4/2006 | Olsen et al. | |
| 2007/0025334 A1 | 2/2007 | Meyer | |
| 2007/0130617 A1* | 6/2007 | Durfee et al. .................... | 726/5 |
| 2008/0066157 A1* | 3/2008 | Stevens et al. ................... | 726/4 |
| 2008/0132206 A1* | 6/2008 | Suzuki ......................... | 455/411 |
| 2008/0155667 A1* | 6/2008 | Hamachi .......................... | 726/6 |
| 2008/0222707 A1* | 9/2008 | Pathuri et al. ................... | 726/4 |

FOREIGN PATENT DOCUMENTS

| | | |
|---|---|---|
| EP | 1701478 A1 | 9/2006 |
| WO | 02100062 A2 | 12/2002 |
| WO | 2004034205 A2 | 4/2004 |
| WO | 2007056383 A1 | 5/2007 |

* cited by examiner

*Primary Examiner* — David Le
(74) *Attorney, Agent, or Firm* — Bachman & LaPointe, P.C.

(57) ABSTRACT

A device and a method for managing access rights to a wireless network uses wireless connection devices advantageously based on a smart card, which enable the wireless connection to the network once connected to a terminal. These devices include devices for time and/or geographical management of access to the network and authentication device. These devices can be easily preprogrammed by the entity managing the service and then distributed to the users.

8 Claims, 4 Drawing Sheets

DEVICE AND METHOD FOR MANAGING ACCESS RIGHTS TO A WIRELESS NETWORK

BACKGROUND

The present invention concerns a device and method for managing access rights to a wireless network.

At the present time, communication networks and more particularly the internet are playing a greater and greater part in communication, whether on a personal level or on a business level. Users express the desire to be able to connect to this network in a way that is if possible permanent or tending to become permanent. In this context, one of the favoured access means is the wireless access that can take place from a mobile communication terminal. In particular, access according to the WiFi standard standardised by the IEEE (Institute of Electrical and Electronics Engineers) in the 802.11 family of standards is tending to become general. This access takes place by the deployment of WiFi access points connected to the information network and enabling terminals, typically a portable computer, to establish a connection with this access point. Once this connection is established, the data traffic is relayed by the access point between the terminal and the communication network.

Such access points are deployed by many economic players. Public accesses managed by local authorities in public establishments such as libraries can be cited. Accesses made available to travelers in airports, railway stations or hotels can also be cited. Businesses also tend to deploy points of access to their computing network and to the internet, firstly for their employees and secondly for visitors.

The purpose of some of these accesses is to be open in an unlimited or uncontrolled fashion, typically a public access or in certain cases access for employees in the company. On the other hand, the purpose of other accesses is limited or controlled, whether for reasons of security for visitors in a business or because it is wished to charge for access, typically in an hotel. These limits may be geographical, visitor access being for example limited to a meeting room in a company. These limits may be temporal, where a system of connection credits sold in an hotel or railway station for example can be used.

At the present time, these constraints are generally managed by the AAA system (Authentication, Authorisation and Accounting) in the form of user accounts with which the constraints are associated. This system is expensive to manage, any sale of a service requiring an update on the central system and the distribution of associated connection identifiers to the user.

SUMMARY OF THE INVENTION

The invention aims to solve the above problems through the use of wireless connection devices advantageously based on a smart card, which allow wireless connection to the network once connected to a terminal. Such devices include means for the temporal and/or geographical management of access to the network and authentification means. These devices can be easily preprogrammed by the entity managing the service and then distributed to the users.

The invention concerns a device for access to a wireless network comprising means of connection to a host device; means of connection to an access point of a wireless network; and means of opening a connection with the access point of the wireless network on reception of a connection activation request so as to allow access to the wireless network to the host machine to which it is connected and means of managing access rights to the wireless network.

According to a particular embodiment of the invention, at least the means of managing access rights to the wireless network are included in a smart card.

According to a particular embodiment of the invention, the means of managing access rights to the wireless network comprise means of limiting this access temporally.

According to a particular embodiment of the invention, the means of managing access rights to the wireless network comprise a certificate having a restricted validity period.

According to a particular embodiment of the invention, the means of managing access rights therefore comprise means of deducting the connection time from a preprogrammed credit.

According to a particular embodiment of the invention, the means of managing access rights to the wireless network comprise means of limiting this access geographically.

According to a particular embodiment of the invention, the means of managing access rights to the wireless network comprise means of managing access control lists for determining what connections are authorised.

The invention also concerns a method of managing access rights to a wireless network comprising a step of receiving a connection activation request by a wireless network access device comprising means of connection to a host device, means of connection to an access point of a wireless network and means of opening a connection with the access point of the wireless network on reception of a connection activation request so as to allow access to the wireless network to the host machine to which it is connected; a step of testing the available access points; a step of checking that at least one available access point is authorised; a connection step if this test is positive; a step refusing connection if this test is negative.

The invention also concerns a method of managing access rights to a wireless network comprising a step of receiving a connection activation request by a wireless access device comprising means of connection to a host device, means of connection to an access point of a wireless network and means of opening a connection with the access point of a wireless network on reception of a connection activation request so as to allow access to the wireless network to the host machine to which it is connected; a step of testing available time; a test of testing availability of the network; a connection step if these two tests are positive; a step refusing connection if one of these tests is negative.

BRIEF DESCRIPTION OF THE DRAWINGS

The features of the invention mentioned above, as well as others, will emerge more clearly from a reading of the following description of an example embodiment, the said description being given in relation to the accompanying drawings, among which.

DETAILED DESCRIPTION OF THE PREFERRED EMBODIMENT(S)

Figure 1:
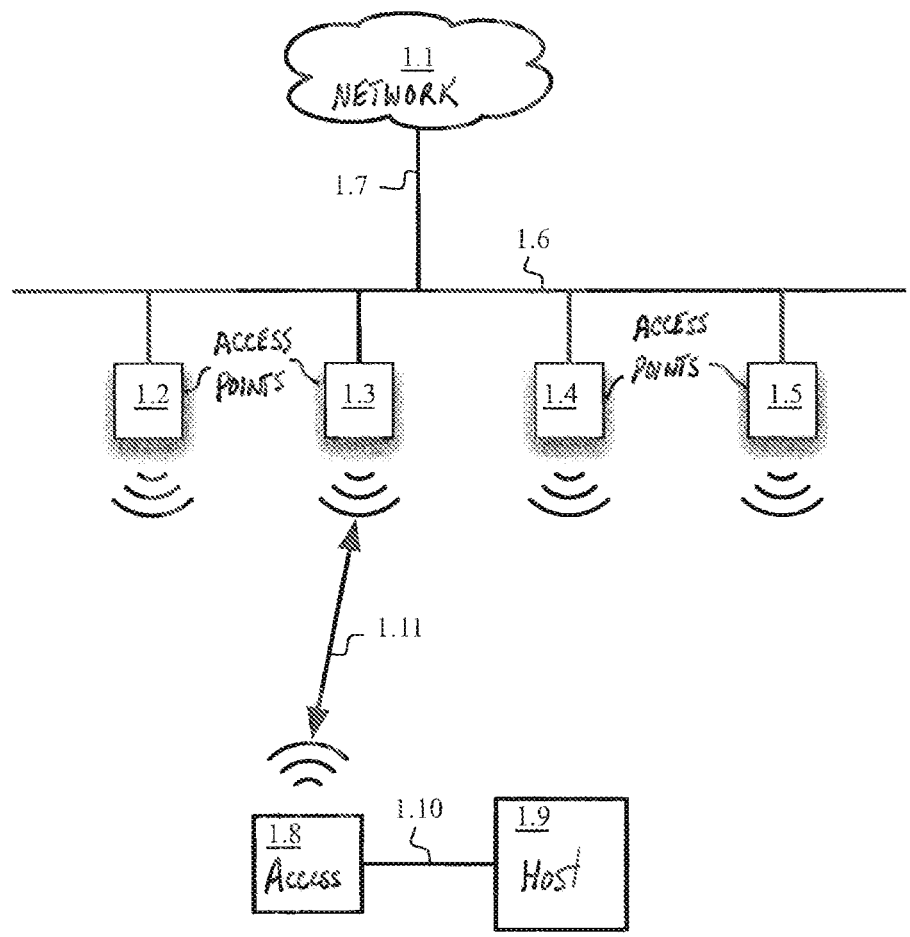
FIG. 1 describes the general architecture of an example of a system using the invention, FIG. 2 describes the hardware architecture of an example embodiment of the invention, FIG. 3 describes a first example of a connection method according to the invention, FIG. 4 describes a second example of a connection method according to the invention.

The general use architecture of the invention is illustrated in FIG. 1. In this figure, a personal terminal 1.9 can be seen, for example a personal computer, a portable computer, a personal assistant or the like. The user of this terminal 1.9 seeks to access a communication network 1.1, typically the internet. Access to this network being available in the environment thereof in the form of one or more wireless access points 1.2 to 1.5, these access points are typically WiFi access terminals. These terminals generally being connected together by a local network 1.6, itself connected to the communication network 1.1 by a link 1.7. It is usual today for the terminals themselves to be provided with a WiFi network interface enabling them to establish a connection with one of the access points in order to establish the connection to the communication network or to the local network to which the access terminals are connected.

The invention is however situated in the context where the authority responsible for managing the local network and access points seeks to control this access. The reasons for this intention to control may be various. They may be reasons of security; it is wished to control who is connecting and from where as well as the resources of the network to which the user may have access. In this case, it may be wished to limit access to certain particular access points or to restrict this access to accounts the authorisations of which will be controlled, for example in order to limit access to an intranet. It may also be the intention to charge for the connection time. In this case, it is the access time that it is wished to be able to check. These various types of control are merely examples; it is possible to use several of them or to add others without departing from the invention.

In this context, the invention is based on the distribution, by the authority managing accesses, of access devices 1.8 to the users. These devices are provided firstly with a means 1.10 of connection to the host terminal 1.9, typically in accordance with the USB (Universal Serial Bus) standard, but other types of connection may be used indifferently such as Bluetooth, Ethernet or other connection technology. The device 1.8 is also provided with wireless connection means according to the communication protocol used by the access points, typically WiFi. The invention is based on the fact that the device comprises means of managing the access rights to the wireless network. The device can then check that the access rights are verified before opening a connection 1.11 with the access point and therefore authorise the user to access the communication network by means of his terminal. The device is then advantageously seen as a network interface by the terminal. The access points are advantageously configured so as to prevent access to any terminal apart from the distributed devices. In certain embodiments, the access points may give free access to a list of known terminals, typically the computers used by the employees in a business, while the unknown computers, those of the visitors, can connect only by using a device according to the invention that is distributed to them.

Figure 2:
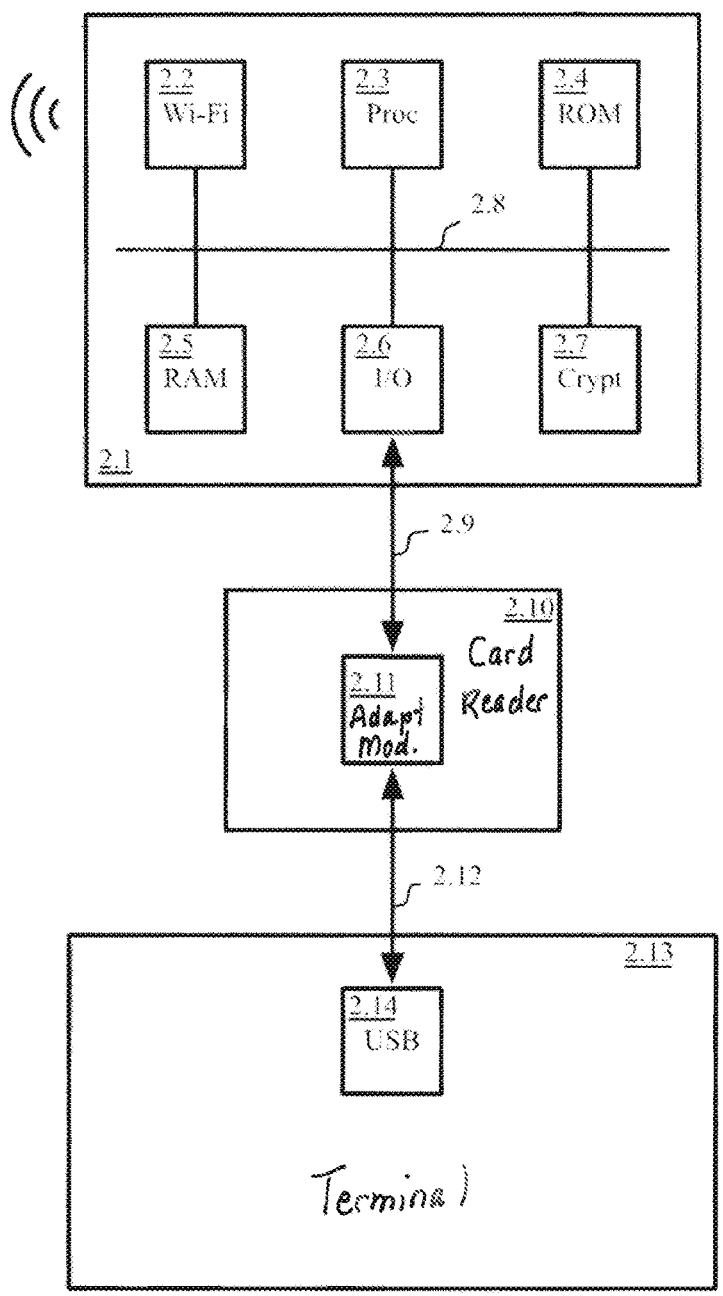

FIG. 2 illustrates the hardware architecture of an example embodiment of the device according to the invention. This embodiment is based on the advantageous use of a smart card 2.1. This smart card is connected to a smart card reader 2.10 of the USB type itself connected to the terminal 2.13 on a USB port 2.14. The smart card can also be integrated in the device, which is then in the form of a USB key containing a WiFi peripheral and an integrated smart card. Although it can be used on a WiFi peripheral connectable by USB, normally referred to as a "WiFi USB key" by simple addition of the right management module, the use of a smart card offers several advantages. This reduces the production costs of the device, the manufacture of a smart card today being mass manufacture. This also makes it possible to profit from the intrinsic protection means integrated on all smart cards. The fraudulent modification of such a card is difficult. This also makes it possible to have peripherals available for programming the cards and therefore for easily generating device programmed with particular rights according to the uses. It is also possible to reuse the card easily by simple programming of rights in order to redistribute it. It can also be distributed in the form of a badge also giving access to the network.

The smart card 2.1 is provided with a WiFi connection radio module 2.2. By means of this radio module, the card is able to establish physical WiFi connections with an access point. Alternatively, this radio module may be implemented on the card reader and communicate therewith. The smart card is controlled by a microcontroller or processor 2.3. It has a software unit composed of an operating system and a set of applications housed in read only memory or ROM 2.4. These software packages use the random access memory 2.5 for execution thereof. It is also usual for this type of card to have a cryptographic coprocessor 2.7 enabling them to accelerate the encryption operations used both for authentication and for any encryption of the data transmitted. Finally, the smart card has a module for managing the inputs/outputs 2.6 managing accesses from outside and in this case with the card reader 2.10. All these modules communicate by means of a bus 2.8.

The exchanges with the terminal to which this smart card is connected pass, in the example embodiment of the invention, through a card reader 2.10 having a USB connection 2.12 with the terminal and managing the inputs/outputs of the smart card 2.1 by means of the link 2.9, the adaptation taking place by means of the adaptation module 2.11.

When the device is connected to the terminal, it appears as a network interface thereof. It then recovers an IP address in keeping with the network to which it is connected. To enable TCP/IP communication on top of the USB connection, the choice is related to the use of the RNDIS (Remote Network Driver Interface Specification) protocol developed by Microsoft. This is a specification for network peripherals functioning on a bus such as for example USB. This choice makes it possible to be compatible without requiring parameterising or adding a special software with a wide selection of operating systems of the terminal of the user such as Windows Vista, Apple Mac OS X or Linux, which in the distribution thereof include by default the management of RNDIS. On Windows XP, it is simply necessary to add a file ".inf" of a few kilobytes. This choice then allows the simple use of the device according to the invention with the majority of user terminals available on the market. A person skilled in the art will understand that other choices can be made on this point, particularly if the invention is implemented with a connection other than USB between the device and the terminal.

The smart card part of the device is not obliged to interpret IP in order to function by limiting the use in space and in time. On the other hand, if the restrictions on access to certain sites—for example it is not wished to authorise access to a precise IP address—are made not by the access point but by the device, the smart card part may interpret IP and prevent any connection to the prohibited IP addresses. Other restrictions can be set up: the card may interpret other protocols and thus control them, for example the interpretation of DNS (Domain Name Server) makes it possible to prohibit domain names. The access rights are managed by the smart card part. A user using the device has no control over the access rights allocated and cannot modify them.

A module for managing access rights to the wireless network is implemented on the card. This module is advantageously integrated in the driver of the radio module 2.2 that manages the WiFi accesses. When the user of the terminal wishes to activate a connection to the communication network, he requests this connection activation of the device. This activation request can take various forms according to the embodiment of the invention. According to a first embodiment, the device being connected to the host computer, the request is made by an action of the user on this host computer. This action may be made by means of software dedicated to the management of the device or by means of network management utilities integrated in the operating system. This action then triggers the activation of the device. According to another embodiment, the device has a control member, button or the like, enabling the user to activate the connection. According to yet another embodiment, activation of the connection is automatic when the device is connected to the host machine. In this case, the user requests activation of the connection simply by connecting the device. This request for activation of the connection is processed by the driver of the radio module 2.2. The request is then managed by the access rights management module, which will check whether a set of conditions relating to these access rights are met in order to authorise connection or not.

These access rights are advantageously stored in protected memory, that is to say in a memory of the smart card that is not accessible from the outside apart from by means of the ad hoc programming tool. These rights comprise the reference of the network with which the device is associated, typically the SSID (Service Set Identifier) of the network in the case of WiFi. Advantageously, they may also comprise a threshold on the strength of the signal as a potential geographical control element. Advantageously, they also comprise the encryption key, for example a WPA (WiFi Protected Access), WPA2, WPA-Enterprise or WPA2-Enterprise key, used for encrypting wireless exchanges between the device and the access point. Some of these keys may be in the form of certificates for limiting in time the use of this key. They also comprise identifiers for connection to the network, typically a connection name (login) and a password, but any other type of identifier can be used. Any type of policy for managing the access rights can be used accompanied by the associated parameters. For example, in the case of access limited in time, the rest of the time available, or time credit, associated with the card is stored. In the case of geographically limited access, the identifiers of the access point or access points authorised are stored, as well as if applicable the thresholds on the signal strength required.

Figure 3:
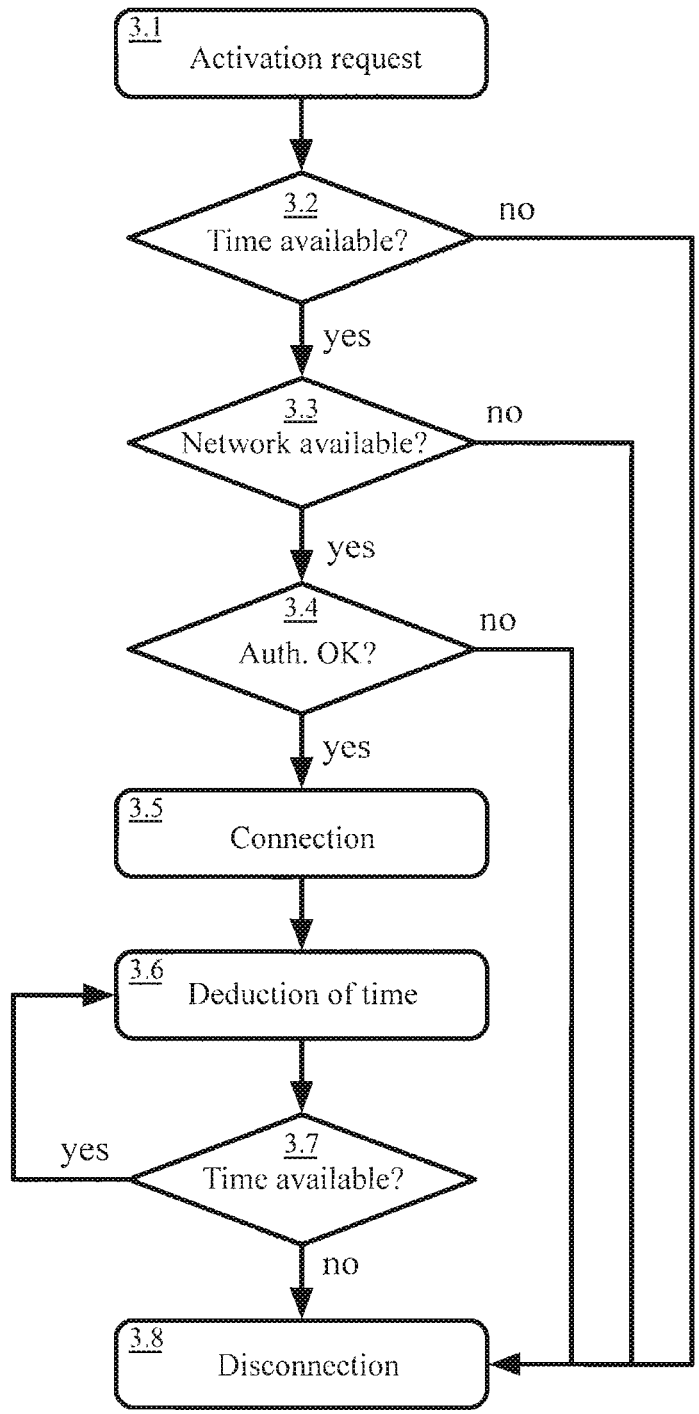

FIG. 3 illustrates an example of functioning of the access rights management module in the case of a temporal limitation of access. During a step 3.1, the module receives a connection activation request. It then tests whether available time remains, that is to say whether there remains time credit allocated to the device during a step 3.2. It also tests, the order of these tests not being significant, whether the network with which it is associated is available during a step 3.3. This availability test may also comprise any test on the fact that the strength of the signal is higher than a signal strength required. If one of these tests is negative, the device refuses to establish the connection during step 3.8. If these two tests are positive, the device authenticates itself with the access point during step 3.4 and, once this authentication is successful, it establishes a connection with the access point during a step 3.5. While the connection remains established, the module deducts the time during a step 3.6. To do this, it periodically tests whether available time remains, step 3.7. The deduction of the time can be done, for example, by means of a clock internal to the token. The remaining time is deducted until the token is disconnected. In the case of the use of a certificate, the validity date is verified by interrogation of a time server using NTP (Network Time Protocol) to know the current precise date. Afterwards, the internal clock is used for knowing the current time and checking that the certificate is not about to expire. It is possible to think of a device combining the use of the deduction of time and a certificate (a parallel can be made with a telephone flat rate over a time limit (1 hour) to be used over one month). In the case of the use of a certificate, the access limit is a limit represented by a fixed date, the certificate revocation date, beyond which connection will no longer be possible. The limit is then independent of the connection time. The current time is periodically compared with the revocation date and time of the certificate in order to check validity thereof. The NTP server may be implemented on the local network, but it is also possible to use servers available on the communication network to which access is made. Typically such servers are available on the internet. When the time credit allocated reaches the zero value or when the certificate expires, the device cuts the connection during step 3.8.

Alternatively, the access point can be programmed to check the validity of the certificate in order to authorise the connection or not. In this alternative, it is the access point that takes care of preventing connection once the validity of the certificate has passed.

Figure 4:
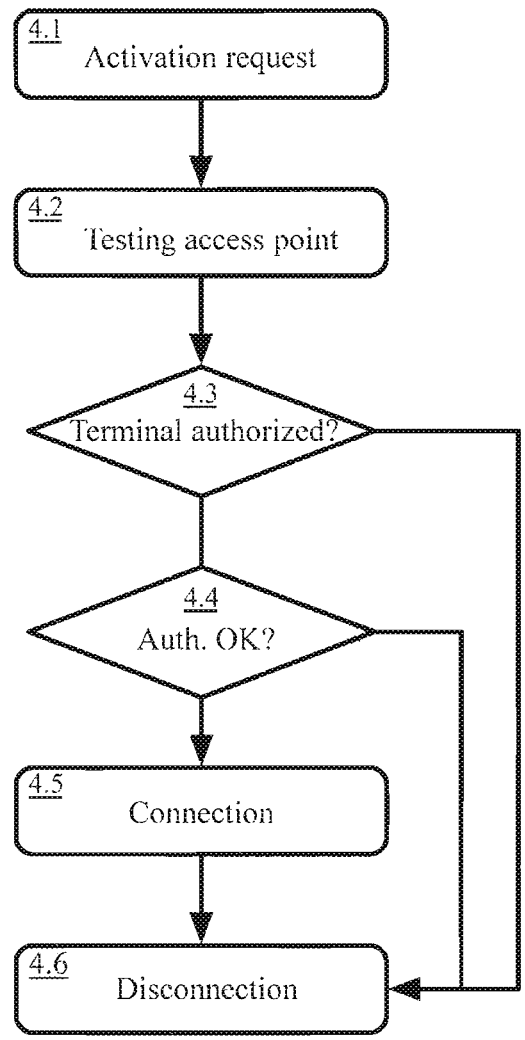

FIG. 4 illustrates another example of functioning of a device according to the invention in the case of management of access rights by geographical limitation. A step 4.1 of receiving a request to activate the connection is found again. In this case, the device has a list, possible unitary, of the identifiers of the access points authorised for a connection from this device. These identifiers may in particular contain the name of the network (ESSID), the MAC address of the access point (SSID), the IP address of the access point or even also the strength of the signal required. The use of this required signal strength makes it possible to limit the access to a geographical area close to the access point. This list is configured in the device when it is personalised. The management module then, during a step 4.2, tests the available access points, that is to say those that are situated within radio range. It checks whether at least one of these points is an authorised access point during a step 4.3. This test comprises any check that the strength of the signal is at least equal to the required signal strength. If this test is negative, the connection is refused by a step 4.6. If this test is positive, the device authenticates itself with the access point during a step 4.4. After a successful authentication, the connection is established during a step 4.5 with the authorised access point detected.

Advantageously, a step of authentication of the user with the device is added. In some cases, this additional security may prove to be useful. This step may be done in several ways. The most certain is to provide the device with a biometric sensor allowing identification, for example by a fingerprint recognition device executed on the device (Match On Card or MOC). Because of this, no entry relating to the authentication is made on the terminal of the client and is therefore not capable of being captured by malevolent software. Alternatively, authentication by password can be done. In this case, the user opens a WEB navigator for example on the terminal and connects to the device. The device has an embedded WEB server that offers an authentication page. It should be noted that the latter solution requires the implementation of IP, HTTP, TLS and TCP on the card part.

The access rights can also be defined in the form of an Access Control List ACL configured during the device personalisation phase. This ACL determines what connections are authorised, which must be protected by the device and which do not need to be. It is then possible to manage authorisations with regard to the distant services accessible, to authorise some of them and to prohibit others. The device then fulfils the role of a firewall filtering the traffic selectively. It is also possible to integrate an encrypted tunnel system or VPN (Virtual Private Network) and therefore to authorise only connection to a particular distant network through this tunnel, the rest of the network remaining inaccessible.

The personalisation of the device can be done, for example, by normal means of programming a protected smart card. This personalisation requires authorisations guaranteeing that a user cannot modify the rights programmed on the device.

Such a device offers the advantage of preserving the sensitive information in the device, advantageously protected within a smart card. They allow the use of wireless networks without modification of the network. The terminal can use it as a conventional network peripheral.

The invention claimed is:

1. A network access device enabling a host device to be connected to a wireless network via an access point of said network, said access device comprising:
    first connecting means for connecting to a host device;
    second connecting means for said network access device connecting via the wireless network to said access point of the wireless network;
    means for storing access rights of said access device to the network;
    managing means for, on reception of a connection activation request sent by the host device to which it is connected, testing whether at least one of the available access points of a wireless network is an access point authorized according to said stored access rights, for refusing the connection with said available access point if this test is negative and authenticating with said available access point if this test is positive, and
    means for, when said authenticating is successful, opening a connection of said network access device with said access point having authenticated said access device by using said stored access rights so as to allow access of said host device with said access point of said wireless network.

2. The device according to claim 1, wherein at least said storage means and the means for managing access rights to the wireless network are integrated in a smart card.

3. The device according to claim 1, wherein the means for managing access rights to the wireless network comprise means for temporally limiting the validity of said access rights.

4. The device according to claim 3, wherein the access rights comprise a certificate having a restricted validity period.

5. The device according to claim 3, wherein the means for managing access rights to the wireless network comprise means for deducting a connection time from a pre-programmed credit.

6. The device according to claim 1, wherein the means for managing access rights to the wireless network comprise means for geographically limiting the validity of the access rights.

7. The device according to claim 1, wherein the means for managing access rights to the wireless network comprise means for managing access control lists for determining validity of the access rights of a particular connection.

8. A method for enabling a host device to be connected to a wireless network via an access point of said network, said method being performed by an access device comprising:
    a first connecting means for connecting a host device,
    a second connecting means for said network access device to be connected to said access point;
    means for storing access rights of said access device to the network, said method comprising:
    receiving a connection activation request from said host device;
    testing whether at least one of the available access points of a wireless network is an access point authorized according to said stored access rights;
    refusing the connection with said available access points if said testing is negative; and
    authenticating with said available access point if said testing is positive; and
    when said authenticating is successful, opening a connection of said network access device with said access point having authenticated said access device by using said stored access rights so as to allow access of said host device with said access point of said wireless network.

* * * * *